Feb. 17, 1953     I. P. PEDRICK     2,628,637
SELECTIVE TYPE OPERATOR FOR MULTIPLE VALVE ASSEMBLIES
Filed June 1, 1949     2 SHEETS—SHEET 1

INVENTOR.
IRENEE P. PEDRICK
BY
ATTORNEYS.

Feb. 17, 1953  I. P. PEDRICK  2,628,637
SELECTIVE TYPE OPERATOR FOR MULTIPLE VALVE ASSEMBLIES
Filed June 1, 1949  2 SHEETS—SHEET 2
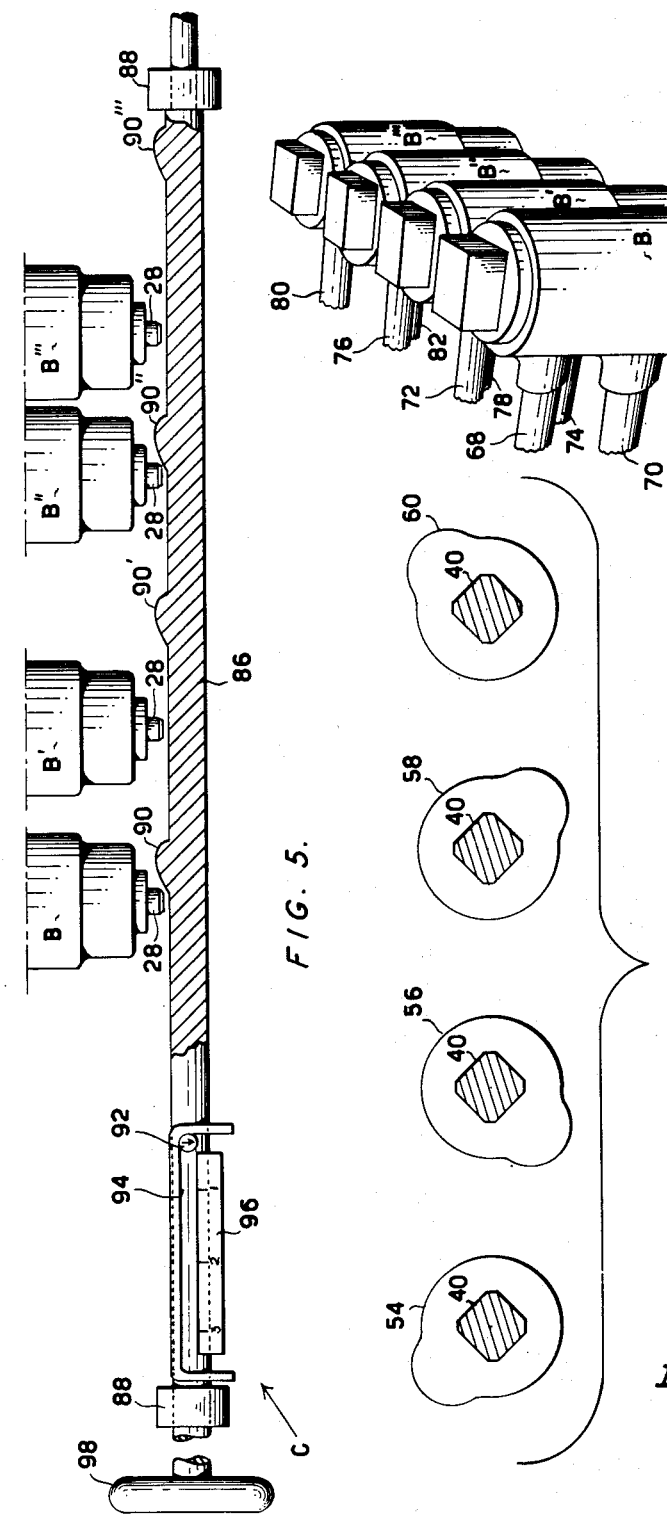
INVENTOR.
IRENEE P. PEDRICK
BY
ATTORNEYS.

Patented Feb. 17, 1953

2,628,637

UNITED STATES PATENT OFFICE 2,628,637

SELECTIVE TYPE OPERATOR FOR
MULTIPLE VALVE ASSEMBLIES

Irenee P. Pedrick, Ardmore, Pa., assignor to
Sellers Injector Corporation, Philadelphia, Pa.,
a corporation of Pennsylvania Application June 1, 1949, Serial No. 96,587

2 Claims. (Cl. 137—635)

This invention relates to apparatus for controlling the operation of a plurality of valves and more particularly relates to such apparatus adapted to operate a plurality of valves in a predetermined sequence.

In the carrying out of numerous commercial processes, it is often requisite that the flow of a plurality of constituents be occasioned in a predetermined sequence. Such a condition is found, for example, in adsorber plants. For example, it is common practice to free benzene by passing it through a layer of active carbon. After the carbon has sufficiently adsorbed the gas, the gas supply must be shut off and a steam supply admitted. When the steam has carried the benzene out of the carbon, the steam supply must be shut off. A supply of hot gas must then be admitted to dry the carbon. When the carbon has been dried, the hot gas supply must be shut off and a supply of cold gas is normally opened to cool the carbon. The sequence of the process then is repeated.

The regulation of such a process by using a separate control for each valve is somewhat confusing and results in considerable time delays in determining which valve should next be opened. Further the individual manual operation of the valves results in undue delay in carrying out the process. Again, where confusion results and the wrong valve is operated, it may cause a great loss of material and unwanted delays.

It is, therefore, the broad object of this invention to provide a valve controlled system comprising a plurality of valves and means to open and close said valves in a predetermined operated sequence by a single control.

This and other objects of this invention will become apparent from a reading of the description in conjunction with the accompanying drawings, in which:

Figure 3 is a side perspective view of the apparatus of Figure 1;

Figure 4 is a schematic showing of the cams of Figure 1;

Figure 5 is a schematic showing of an alternative valve control apparatus in accordance with this invention.

Figure 1:
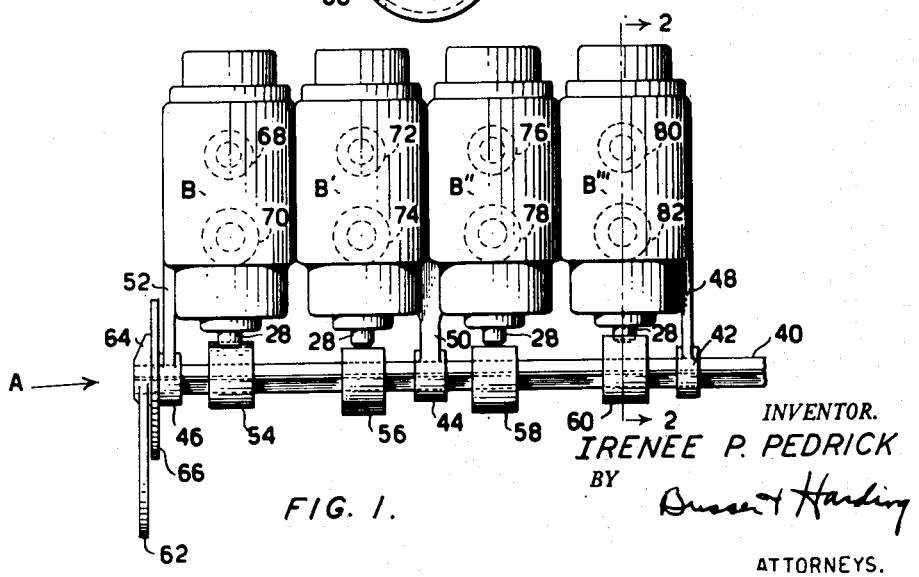
Figure 1 is a front elevation of a plurality of valves and a valve control apparatus in accordance with this invention.

The embodiment of the invention shown in Figure 1 comprises a valve control apparatus A in association with valves B, B', B" and B'", all of which valves are identical.

Figures 2, 6:
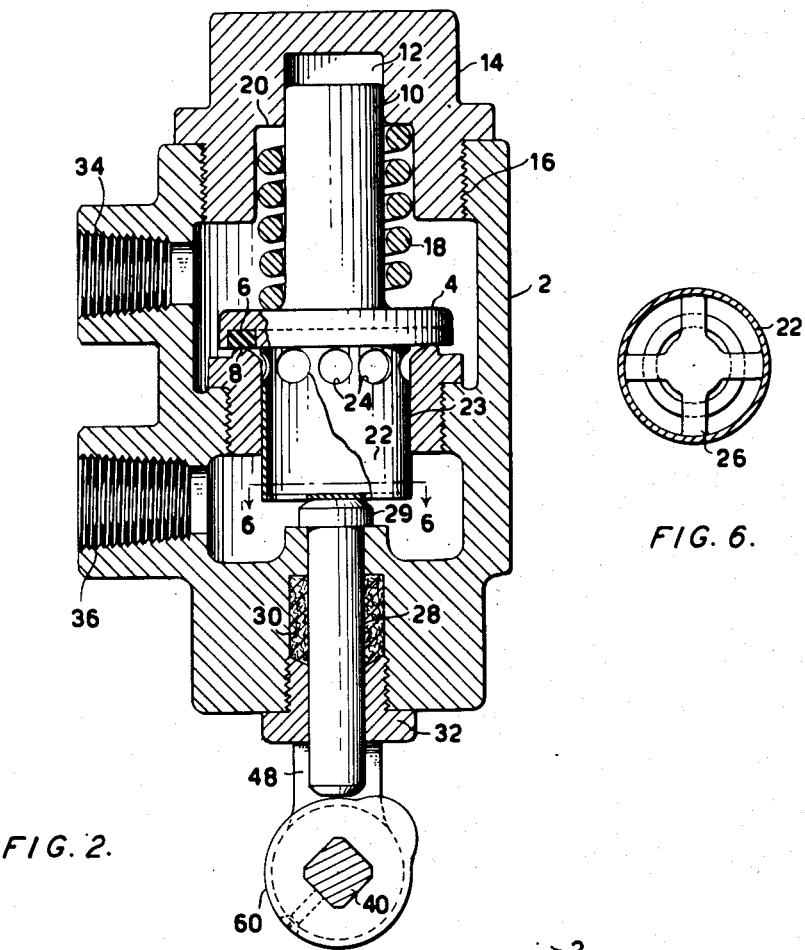
Figure 2 is a vertical section taken on the plane indicated by the line 2—2 in Figure 1.
Figure 6 is a section taken on the plane indicated by the line 6—6 in Figure 2.

As shown in Figure 2, each valve comprises a body portion 2 containing a valve head 4 which has a circular insert gasket 6 which is adapted to abut or engage the valve seat 8. Valve head 4 is carried by valve stem 10 which is adapted to slide within a passage 12 in plug 14. Plug 14 is threaded to body portion 2 as indicated at 16. A coil compression spring 18 embraces valve stem 10 and abuts at its opposite ends against plug shoulder 20 and valve head 4, thus biasing valve head 4 downwardly against the valve seat.

A cylindrical member 22 is secured to the bottom of valve head 4 and is adapted to slide in passage 23 in body portion 2. Member 22 has a plurality of openings 24 adjacent the valve head 4. Secured to the bottom of member 22 is a spider 26.

Plunger 28 passes through the bottom of body portion 2. An enlarged head portion 29 on plunger 28 is adapted to engage spider 26 and acts as a stop when it abuts against body portion 2. Packing 30 and threaded gland 32 embrace plunger 28 to prevent the leakage of fluid. Plunger 28 projects beyond gland 22 where it may be engaged by a cam.

Body portion 2 of the valve has a threaded inlet opening 34 and a threaded outlet opening 36. It will be apparent that when the plunger 28 is raised it will force cylindrical member 22 and valve head 4 upwardly against spring 18, thus permitting the fluid to flow through inlet opening 34 between gasket 6 and valve seat 8, through openings 24, through the interior of member 22, through the openings in spider 26, and then out through outlet opening 36. It will further be clearly apparent that when no upward pressure is exerted on plunger 28 the valve will seat due to the action of spring 18 thus stopping the flow of liquid.

The control apparatus A has a square shaft 40 which is rounded off where supported by bearings 42, 44 and 46. Bearings 42, 44 and 46 are supported by brackets 48, 50 and 52, respectively.

Cams 54, 56, 58 and 60 are secured to shaft 40 in a position directly below the plungers 28 of valves B, B', B" and B'", respectively.

An operating handle 62 is secured to shaft 40 exterior of bracket 42. Handle 62 has a pointer 64 which is adapted to pass over an indicator plate 66. The handle as shown in Figure 1 is in the "off" position and plate 66 indicates that the clockwise rotation of shaft 40 will result in the sequential supply of steam, water, brine and air.

This sequential operation is attained by cutting cams 54, 56, 58 and 60 as shown most clearly in Figure 4. These cams are shown in Figure 4 as they would appear from a side view when the pointer 64 is set on "off" as shown in Figures 1 and 3. It will be apparent that the high points of the adjacent cams are separated from each other by 90° and positioned such that a 45° rotation of handle 62 will place the high point of cam 54 under the plunger 28 of valve B and that successive 90° turns will bring the high points of cams 56, 58 and 60 under the plungers of their respective valves. The raised portion of each cam surface is sufficiently less than 90° to provide for the disengagement from the plunger 28 in operation from its cam before the next plunger to operate is engaged by its cam. Thus only one valve is open at a time.

Thus in operation, for example, when pointer 64 is turned clockwise to steam, cam 54 through plunger 28 opens valve B permitting steam to enter the valve through pipe 68 and leave the valve through pipe 70. Turning the pointer an additional 90° results in the closing of valve B and the opening of valve B′, thus permitting water in pipe 72 to flow through valve B′ into pipe 74. Again, an additional turn of 90° results in the closing of valve B′ and the subsequent opening of valve B″, thus permitting brine in pipe 76 to flow through valve B″ in pipe 78. Similarly, an additional turn of 90° causes the closing of valve B″ and the subsequent opening of valve B‴ permitting air in pipe 80 to flow through valve B‴ into pipe 82. A further rotation of 45° places all of the valves in the closed position and positions the control apparatus A for a new cycle of operation.

A modified embodiment of the invention is illustrated in Figure 5. Here a control apparatus C is associated with the identical valves B, B′, B″ and B‴. Control apparatus C comprises a round rod 86 which is mounted for sliding in bearings 88. The upper surface of rod 86 has a plurality of identical cams 90, 90′, 90″ and 90‴ which are adapted to engage the valve plungers 28 of valves B, B′, B″ and B‴, respectively.

A guide pin 92 is secured to rod 86 perpendicular to the axis of the rod. Pin 92 is adapted to be guided by a guideway 94. Plate 96 which forms the inner boundary of the guideway carries numerals indicating the proper sequential positions of the control apparatus. Rod 86 is operated by means of a handle 98 secured to one end of the rod.

In order to operate control apparatus C, pin 92 is positioned in the right hand end of guideway 94. Rod 86 is then pulled to the left until pin 92 registers with numeral 1 on plate 96. Cams 90 and 90″ are so located that when the shaft is in this position they will have cammed valves B and B″ to the maximum open position. When the rod 86 is pulled to the left until pin 92 registers with the numeral 2 on plate 96, it will result in the closing of valves B and B″ and the subsequent opening of valve B′. When the rod 86 is further pulled to the left until pin 92 registers with numeral 3 on plate 96, it will result in the closing of valves B′ and the subsequent opening of valve B‴. When it is desired to close valve B‴, rod 86 is pulled to the left until pin 92 is clear of plate 96 when the rod 86 may be turned clockwise and carried back to the right to the starting position without the engagement of the cams with the valve plungers.

It will be apparent that the cams 90, 90′, 90″ and 90‴ may be variously positioned so as to open the valves sequentially, one or more of the valves being opened at the same time. As illustrated above, the operation is adapted to a three step process where two fluids are desired in the first step and only one fluid is in each of the succeeding steps.

It will be understood that the above embodiments of the invention are for purposes of illustration only and that the invention should be limited only as set forth in the following claims.

What is claimed is:

1. In combination, a plurality of cam operated valves, a slidably and rotatably mounted rod and a plurality of cams on the rod, each cam being adapted to operate a valve, a pin guideway parallel to said rod and a pin secured to said rod perpendicular to its axis and adapted to fit in said guideway so as to place said cams in position to operate the valves when the rod is slid, said guideway having an opening at each end to permit rotation of said pin out of one end of said guideway and said cams out of alignment with said valves and to permit rotation of said pin into the other end of said guideway and said cams into alignment with said valves whereby the rod can be reset at the end of a cycle of operation without camming the valves open.

2. In combination, a plurality of cam operated valves, a rod mounted for rotational and longitudinal movement, a plurality of cams on the rod, each cam being adapted to operate a valve, said cams being in line and extending an amount less than the total periphery of the rod sufficient to provide for the longitudinal movement of the rod past the valves without camming the valves when desired, a pin guideway parallel to said rod and a pin secured to said rod perpendicular to its axis and adapted to fit in said guideway so as to place said cams in position to operate the valves when the rod is slid, said guideway having an opening at each end to permit the turning of the rod to a position where the cams are out of line with the valves and resetting of the rod without camming the valves open.

IRENEE P. PEDRICK.

REFERENCES CITED

The following references are of record in the file of this patent:

UNITED STATES PATENTS

| Number | Name | Date |
|---|---|---|
| 1,590,226 | Boisset | June 29, 1926 |
| 2,363,235 | Ellinwood | Nov. 21, 1944 |
| 2,431,944 | Lauck | Dec. 2, 1947 |
| 2,453,707 | Graham | Nov. 16, 1948 |
| 2,460,011 | Hungerford | Jan. 25, 1949 |

FOREIGN PATENTS

| Number | Country | Date |
|---|---|---|
| 673,823 | Germany | of 1939 |